(12) United States Patent
Shenoy et al.

(10) Patent No.: US 8,949,940 B1
(45) Date of Patent: Feb. 3, 2015

(54) AGGREGATING DATA FROM MULTIPLE ISSUERS AND AUTOMATICALLY ORGANIZING THE DATA

(75) Inventors: Ganesh N Shenoy, Cedar Park, TX (US); Deepa G Shenoy, Cedar Park, TX (US)

(73) Assignee: Mahasys LLC, Cedar Park, TX (US)

( * ) Notice: Subject to any disclaimer, the term of this patent is extended or adjusted under 35 U.S.C. 154(b) by 143 days.

(21) Appl. No.: 13/271,901

(22) Filed: Oct. 12, 2011

(51) Int. Cl.
*G06F 7/04* (2006.01)
*G06F 15/16* (2006.01)

(52) U.S. Cl.
USPC .............. 726/4; 726/27; 707/636; 707/671; 707/754; 707/822; 707/829; 707/830; 709/202; 709/203

(58) Field of Classification Search
CPC .................................................. H04L 67/306
USPC ............................................................ 726/4
See application file for complete search history.

(56) References Cited

U.S. PATENT DOCUMENTS

| | | | |
|---|---|---|---|
| 6,185,683 B1 | 2/2001 | Ginter et al. | |
| 7,778,848 B1 * | 8/2010 | Reeves | 705/3 |
| 2002/0016801 A1 * | 2/2002 | Reiley et al. | 707/523 |
| 2002/0161928 A1 * | 10/2002 | Ndili | 709/246 |
| 2003/0046112 A1 * | 3/2003 | Dutta et al. | 705/3 |
| 2004/0078236 A1 * | 4/2004 | Stoodley et al. | 705/2 |
| 2005/0192008 A1 * | 9/2005 | Desai et al. | 455/435.2 |
| 2006/0190290 A1 * | 8/2006 | Gomez | 705/1 |
| 2007/0027715 A1 * | 2/2007 | Gropper et al. | 705/2 |
| 2007/0078687 A1 * | 4/2007 | Dettinger et al. | 705/3 |
| 2008/0263048 A1 * | 10/2008 | Wise | 707/9 |
| 2009/0055852 A1 * | 2/2009 | Sardera | 725/9 |
| 2009/0138284 A1 * | 5/2009 | Guadagna et al. | 705/3 |
| 2009/0193267 A1 * | 7/2009 | Chung | 713/193 |
| 2009/0240787 A1 * | 9/2009 | Denny | 709/219 |
| 2009/0271289 A1 * | 10/2009 | Klinger et al. | 705/26 |
| 2010/0064349 A1 * | 3/2010 | Randle et al. | 726/4 |
| 2010/0082981 A1 | 4/2010 | Church et al. | |
| 2010/0162172 A1 * | 6/2010 | Aroner | 715/838 |
| 2010/0241595 A1 | 9/2010 | Felsher | |
| 2010/0262435 A1 * | 10/2010 | Smith et al. | 705/3 |
| 2010/0313215 A1 * | 12/2010 | McCoskey et al. | 725/31 |
| 2011/0035444 A1 | 2/2011 | Hill | |
| 2011/0035581 A1 | 2/2011 | Maller | |
| 2011/0113035 A1 * | 5/2011 | Manjunath et al. | 707/741 |
| 2011/0197070 A1 * | 8/2011 | Mizrah | 713/176 |
| 2011/0208766 A1 | 8/2011 | Lang | |
| 2011/0276493 A1 * | 11/2011 | Graham et al. | 705/53 |
| 2011/0289553 A1 * | 11/2011 | Carter et al. | 726/1 |
| 2012/0065995 A1 * | 3/2012 | Singh et al. | 705/3 |
| 2012/0102566 A1 * | 4/2012 | Vrancken et al. | 726/20 |
| 2012/0110074 A1 * | 5/2012 | Getchius | 709/204 |

(Continued)

*Primary Examiner* — Ashok Patel
*Assistant Examiner* — Gary Gracia
(74) *Attorney, Agent, or Firm* — Lee & Hayes, PLLC

(57) ABSTRACT

Some implementations provide techniques and arrangements to aggregate data from multiple issuers. An aggregator server may receive data associated with a user from an issuer. The data may include an issuer identifier associated with the issuer, account access data associated with the user, and a storage location identifier. The aggregator server may authenticate an identity of the issuer based on the issuer identifier and determine whether the issuer is authorized to provide the data for the user. In response to determining that the issuer is authorized to provide the data for the user, he aggregator server may identify an account associated with the user based on the account access data and store the data in the account associated with the user based at least partially on the storage location identifier.

20 Claims, 8 Drawing Sheets

(56) References Cited

U.S. PATENT DOCUMENTS

| | | | |
|---|---|---|---|
| 2012/0117031 A1* | 5/2012 | Cha et al. | 707/674 |
| 2012/0128241 A1* | 5/2012 | Jung | 382/165 |
| 2012/0204026 A1* | 8/2012 | Shi et al. | 713/155 |
| 2012/0215560 A1* | 8/2012 | Ofek et al. | 705/3 |
| 2012/0246297 A1* | 9/2012 | Shanker et al. | 709/224 |
| 2012/0303606 A1* | 11/2012 | Cai et al. | 707/709 |
| 2013/0036454 A1* | 2/2013 | Purvis et al. | 726/4 |
| 2013/0073485 A1* | 3/2013 | Sathish et al. | 706/12 |

* cited by examiner

AGGREGATING DATA FROM MULTIPLE ISSUERS AND AUTOMATICALLY ORGANIZING THE DATA

BACKGROUND

An individual may receive documents, such as healthcare records, financial statements, or government statements, that the individual desires to preserve. If the documents are provided as hard copies (e.g., paper documents), then the individual may physically organize them using a filing cabinet. If the documents are electronically provided, in some cases, the individual may print off the electronic documents to create paper documents and physically organize them. However, this manual process of physically organizing documents is tedious and time consuming.

In some cases, the individual may create directories on a computer-accessible storage device and organize the electronic documents using the directories. However, this is still a manual process that may be time consuming for a user to perform. In addition, the electronic documents may be difficult to access remotely via other devices. For example, the user may be unable to access the electronic documents when the user is not at home. Furthermore, if the storage device malfunctions (e.g., hard disk crash), then some or all of the stored documents may become inaccessible.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations provide techniques and arrangements to aggregate data, such as financial statements, healthcare records, or government statements, from multiple issuers. The data may be received from the multiple issuers via secure means to prevent unauthorized usage. An individual may provide the issuers with account access data that enables the issuer to send data to an account associated with a particular individual and to specify a location in the account in which the data is to be stored.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Content Aggregation

Figure 1:
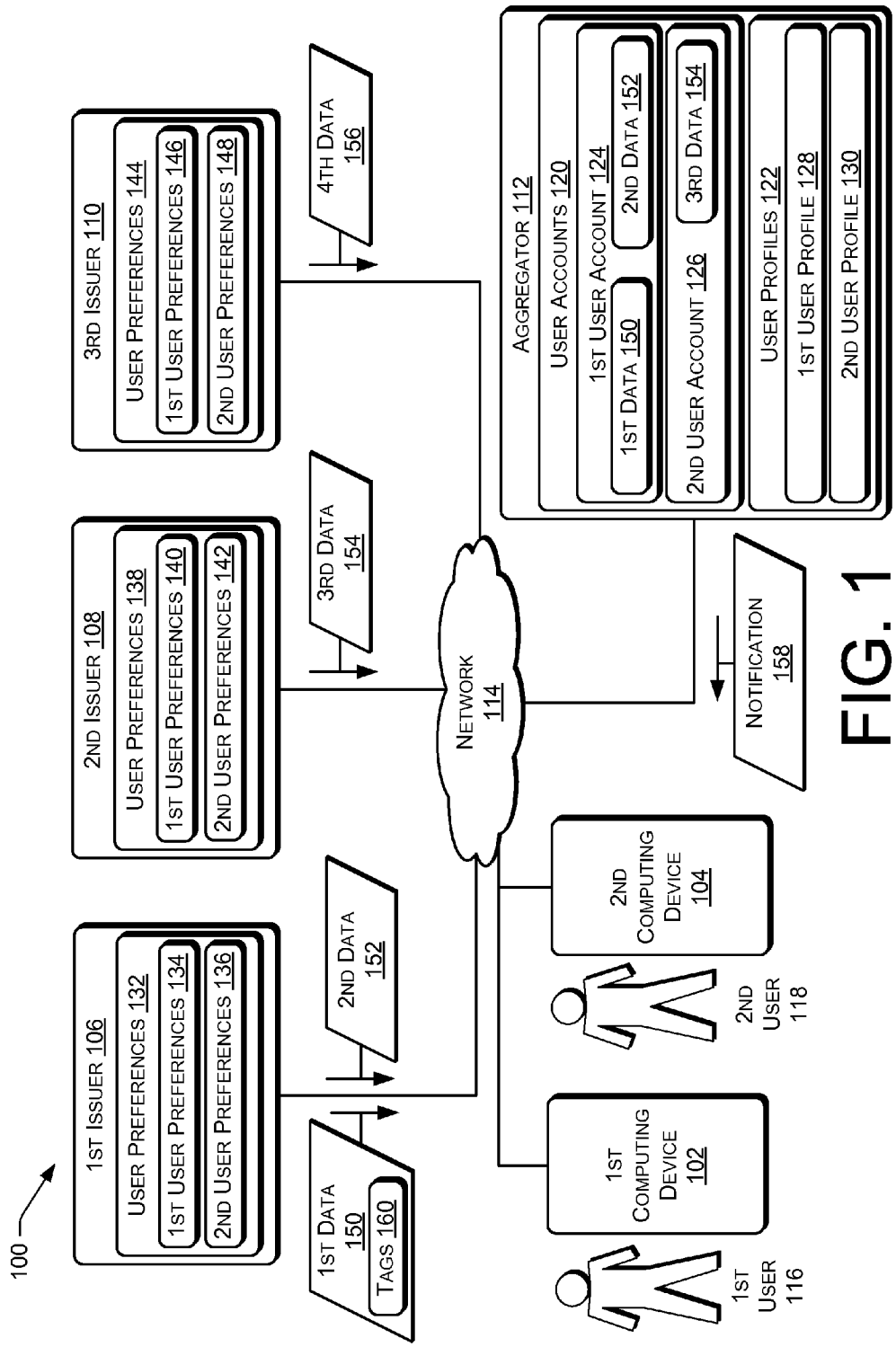
FIG. 1 illustrates an example framework to aggregate data from multiple issuers according to some implementations.

An issuer may be any entity (e.g., an individual or a corporate entity) with whom a user has a relationship (e.g., customer relationship, client relationship, patient relationship, and the like). The issuer may provide documents (e.g., paper documents, electronic documents, or both) that include details associated with the relationship. For example, a merchant may issue a receipt to a user at a point-of-sale (POS) system after the user has made a purchase via the merchant. As another example, a financial institution (e.g., a bank, an investment company, a credit card provider, and the like) may provide the user with monthly statements. As yet another example, a healthcare provider (e.g., a doctor, a dentist, a hospital, a lab, and the like) may provide the user with a document in response to the user visiting the healthcare provider. In some cases, the document from the healthcare provider may include financial data as well as healthcare-related data (e.g., test results).

Users may find it tedious or cumbersome to organize paper documents by filing them into folders in a filing cabinet, etc. As used herein, the term "user" may refer to an individual, a group of related individuals (e.g., a family or an organization), a business entity, or any other type of entity for which an issuer may generate data. Organizing electronic documents received from multiple issuers may also be difficult for a variety of reasons. For example, some issuers may not transmit sensitive information electronically because of security concerns. Instead, issuers may provide documents on a secure website and enable users to securely access the documents. However, this arrangement may still be tedious or cumbersome as a user may have to create accounts on multiple websites and periodically login to multiple websites to electronically retrieve the documents. In addition, many issuers may retain documents for a particular time period, after which the documents are no longer available. If the user does not retrieve the documents within the particular time period, the user may be unable to access the documents.

After retrieving the information electronically, the user may store the retrieved information on a storage device, such as a disk drive. If the storage device malfunctions, at least some of the information may become inaccessible. Moreover, if the storage device is part of a portable device (e.g., a laptop computer or mobile phone) and the portable device is stolen, the user may not only lose the stored information, but the information may be used for identity theft or fraud.

In some implementations described herein, An aggregator may provide accounts to subscribers and electronically aggregate sensitive, confidential, or other types of information from multiple issuers, such as financial institutions, healthcare providers, or governmental entities. The aggregator may use a security mechanism, such as encryption, to enable issuers to securely provide the information to the aggregator via a public network, such as the Internet.

The aggregator may create a hierarchical account structure or other general linked structure based on the issuers associated with a particular user. A user may specify a set of issuers from which the user desires to receive data. The aggregator may identify what type of information the issuer provides and automatically (e.g., without human interaction) create an appropriate hierarchical structure for the user's account. The user may modify the hierarchical user account structure created by the aggregator. The aggregator may contact the set of issuers specified by the user and indicate to the issuers that the aggregator is authorized to receive information from the issuers on behalf of the user.

When the aggregator receives data from an issuer, the aggregator may authenticate the issuer to determine whether the issuer is authorized to provide data for the user. In some cases, the issuer may provide an authentication code that the user has configured for the issuer, such as a personal identification number (PIN) number or code. This may prevent unauthorized data (e.g., "spam") from being added to the user's account. If the data is encrypted to prevent unauthorized usage, the aggregator may decrypt the data prior to storing the data. Based on user account information in the data, the aggregator may identify an account of a user and store the data in a particular location of the account. The location where the aggregator stores the data may be determined based on a location provided by the issuer in the data, a location specified in a user profile hosted by the issuer, a location specified in a user profile hosted by the aggregator, a default location specified by the aggregator, or any combination thereof.

In some cases, the issuer may include tags associated with the data to identify various characteristics of the data, such as the type of data. For example, a credit card statement may be tagged with "financial," "credit card," an issuer identifier (e.g., "Bank XYZ"), another tag associated with a characteristic of the data, or any combination thereof. The aggregator may associate tags with data based on the user's profile before storing the data in the user's account. The tags may enable the user to search, sort, and organize the data stored in the user's account.

Thus, a user may login to an associated user account hosted by the aggregator and view multiple data items associated with the user, including confidential and sensitive information. The multiple data items may be received from multiple issuers and may be organized in the account via a hierarchical structure. The aggregator may automatically store data received from an issuer in a particular location in the account, thereby relieving the user from manually organizing the data.

A user may have more than one account with the aggregator. For example, a user may have a first account for data items associated with a business owned and/or managed by the user. The user may have a second account for data items associated with individuals related to the user. For example, the second account may be used for data items associated with the user's spouse, the user's children, the user's parents, other related individuals, or any combination thereof.

Illustrative Framework for Aggregating Content from Multiple Issuers

FIG. 1 illustrates an example framework 100 to aggregate data from multiple issuers according to some implementations. The framework 100 includes a first computing device 102, a second computing device 104, a first issuer 106, a second issuer 108, and a third issuer 110 coupled to an aggregator 112 via a network 114. The network 114 may include multiple networks using a variety of technologies, such as wireline technologies (e.g., public switched telephone network (PSTN), optical networks, and the like) and wireless technologies (code division multiple access (CDMA), global system for mobile (GSM), other types of telecommunications technologies, and the like). A first user 116 may be associated with the first computing device 102. A second user 118 may be associated with the second computing device 104. The aggregator 112 may include multiple servers that serve different set of users in different geographies. The multiple servers may be physically located in different geographic areas for technical, legal, or other business reasons.

The aggregator 112 may provide user accounts to multiple users, such as the users 116 or 118. For example, the users 116 or 118 may be subscribers to a service provided by the aggregator 112. The aggregator 112 may provide various services to subscribers, including hosting user accounts 120 and user profiles 122. The user accounts 120 may include accounts associated with multiple subscribers, such as the users 116 or 118. For example, the user accounts 120 may include a first user account 124 associated with the first user 116 and a second user account 126 associated with the second user 118. The user profiles 122 may include user profiles associated with the multiple subscribers, such as a first user profile 128 associated with the first user 116 and a second user profile 130 associated with the second user 118. The user profiles 122 may include preferences associated with each subscriber. For example, the first user profile 128 may indicate how the first user 116 prefers to have the first user account 124 organized, how the first user 116 prefers to be contacted/notified (e.g., voice call, text message, email, and the like), the issuers from which the first user 116 prefers to receive data, how long particular data is to be retained, under what conditions data is to be archived, compressed, or deleted, other user preferences, or any combination thereof.

The issuers 106, 108, or 110 may be entities that generate information associated with users (e.g., the users 116 and 118). For example, the issuers 106, 108, or 110 may include financial issuers (e.g., banks, credit card issuers/managers, investment management firms, and the like), health-related issuers (e.g., hospitals, doctors, dentists, and the like), other types of issuers, or any combination thereof. In some instances, the information generated by the issuers 106, 108, or 110 may include private (e.g., confidential or sensitive) information, such as account balance information or lab results (e.g., blood tests, x-rays, and the like). Because of privacy concerns, issuers may not send private information via email to users and instead request that users create an account, and securely login to an issuer website to retrieve user-related documents. The aggregator 112 may address this issue by enabling issuers that have privacy concerns to securely transmit documents to a user account provided by the aggregator 112.

The issuers 106, 108, or 110 may enable users (e.g., the users 116 or 118) to provide preferences identifying how to contact or provide information to the users. Initially, the user preferences may include default values provided by the issuers 106, 108, or 110. The users 116 or 118 may modify the user preferences, including the default values. For example, the preferences may specify a mailing address, one or more phone numbers, an email address, an account identifier (e.g., for an account with the aggregator 112), a location in the user's account in which to store the data, rules for associating tags with data, under what conditions data should be sent, how often data should be sent, other preferences, or any combination thereof. The first issuer 106 may host user preferences 132 that include user preference files associated with multiple users, such as a first user preferences 134 associated with the first user 116 and a second user preferences 136 associated with the second user 118. The second issuer 108 may host user preferences 138 that include user preference files associated with multiple users, such as a first user preferences 140 associated with the first user 116 and a second user preferences 142 associated with the second user 118. The third issuer 110 may host user preferences 144 that include user preference files associated with multiple users, such as a first user preferences 146 associated with the first user 116 and a second user preferences 148 associated with the second user 118. The first user preferences 134, 140, and 146 may include preferences for the first user 116 with reference to each of the issuers 106, 108, and 110, respectively.

The preferences may include account identifiers to enable the issuers 106, 108, or 110 to identify the user accounts that are associated with the users. For example, the first user preferences 134 may include an account identifier of the first user account 124 associated with the first user 116. The first issuer 106 may include the account identifier in data sent to the aggregator 112 to enable the aggregator to place the data in the first user account 124.

In operation, multiple users, such as the users 116 or 118, may subscribe to services provided by the aggregator 112. In response to subscribing to services, the aggregator 112 may provide the users with associated user accounts, such as the user account 124 and the user account 126, respectively. The users may then notify issuers (e.g., the issuers 106, 108, or 110) that the users have established accounts with the aggregator 112. In some cases, the user preferences hosted by the issuers may be created based on the user profiles 122. For example, the first user 116 may instruct the first issuer 106 to create the first user preferences 134 based on the first user profile 122. As another example, in response to the first user 116 creating an account with the aggregator 112, the aggregator may create the first user preferences 134 based on the first user profile 128 and send the first user preferences 134 to the first issuer 106.

The first issuer 106 may send first data 150 to the aggregator 112 via the network 114. The first data 150 may include an issuer identifier that enables the first issuer 106 to establish its credentials with the aggregator 112. For example, the aggregator 112 may authenticate an issuer identifier provided by the first issuer 106. In some cases, data sent by an issuer may be in the form of an electronic mail ("email") sent to an email address associated with a user. For example, the first data 150 may be in the form of an email that is sent to an email address associated with the user account 124.

The first data 150 may include information identifying which user account is associated with the first data 150. The first data 150 may include information identifying a restricted public key that the issuer may use to store data into the user's account that is hosted by the aggregator 112. The restricted public key may include identification data that the user may configure at the aggregator 112 and provide to the issuer to enable the issuer to provide data to the user's account. The restricted public key may help reduce or eliminate spam because only issuers with knowledge of the data key will be able to issue information to user accounts that are hosted by the aggregator 112. For example, the aggregator 112 may receive the first data 150, identify account related information that is included in the first data 150, determine that the first data 150 is associated with the first user 116, and after determining that a provided restricted public key corresponds to the users account, place the first data 150 in the first user account 124 that is associated with the first user 116. The first data 150 may include a location identifier of a location in the user account in which to place the first data 150. For example, the aggregator 112 may place at least a portion of the first data 150 in a particular location in the first user account 124 based on the location identifier that is included in the first data 150. To illustrate, the aggregator 112 may place a bank statement from issuer Bank XYZ in the folder labeled "Bank XYZ— Savings Account." If the first data 150 does not include a location identifier, the location where the first data 150 is stored may be determined based on the first user profile 128 of the first user 116 or a default location specified by the aggregator 112.

The first issuer 106 may send second data 152 to the aggregator 112. For example, the first data 150 may include a first monthly statement and the second data 152 may include a second monthly statement. The second data 152 may include information identifying a particular user associated with the second data 152. For example, the aggregator 112 may determine that the second data 152 is associated with the first user 116 and place the second data 152 in the first user account 124. The aggregator 112 may place at least a portion of the data 152 in a particular location of the first user account 124 based on the second data 152, the first user profile 128, a default location provided by the aggregator 112, other preference information associated with the first user 116, or any combination thereof.

The second issuer 108 may provide third data 154 associated with the second user 118. The aggregator 112 may examine the third data 154 and determine that the third data 154 is associated with the second user 118. The aggregator 112 may store the third data 154 in the second user account 126 associated with the second user 118. The aggregator 112 may place at least a portion of the third data 154 in a particular location of the second user account 126 based on the third data 154, the second user profile 130, a default location provided by the aggregator 112, other preference information associated with the second user 118, or any combination thereof.

The third issuer 110 may provide fourth data 156 associated with the second user 118. The aggregator 112 may examine the fourth data 156 and determine that the fourth data 156 is associated with the second user 118. The aggregator 112 may store the fourth data 156 in the second user account 126 associated with the second user 118. The aggregator 112 may place at least a portion of the fourth data 156 in a particular location of the second user account 126 based on the fourth data 156, the second user profile 130, a default location provided by the aggregator 112, other preference information associated with the second user 118, or any combination thereof.

In some instances, one or more of the data 150, 152, 154, or 156 may be encrypted using an encryption scheme. The encryption scheme may use 32-bit or greater (e.g., 56-bit, 64-bit, 128-bit, 256-bit, and the like) encryption and may comply with an encryption standard, such as the data encryption standard (DES). For example, the issuers 106, 108, or 110 may use public keys to encrypt data (e.g., the data 150, 152, 154, or 156) sent to the aggregator 112. The aggregator 112 may use a private key to decrypt the encrypted data received from the issuers before storing the data in a user account corresponding to a subscriber. By encrypting the data (e.g., the data 150, 152, 154, or 156), the issuers 106, 108, or 110 may prevent the unauthorized use of the data in the event that the data is electronically intercepted. In addition, the data stored in the user's account may be encrypted with a user configured key to prevent unauthorized use of the data. This ensures that data in the user's account hosted by the aggregator 112 is secure even from employees of the aggregator 112.

The aggregator 112 may store at least a portion of the data (e.g., the data 150, 152, 154, or 156) in a particular location in a user account. The particular location where data is stored for a particular user may be determined based on information provided in the data (e.g., based on a default value provided by the issuer or based on the user preferences that are hosted by the issuer), the user profile hosted by the aggregator 112, a default value provided by the aggregator 112, or any combination thereof. In some instances, the first user preferences 134 may include override information identifying which location preference overrides another location preference. For example, the first user profile 128 may specify that when the first data 150 is provided to the aggregator 112, a location where the first data 150 is stored is determined by first determining whether the first user profile 128 specifies a location. If the first user profile 128 specifies a location to store the first data 150, then the aggregator 112 may use that location. If the first user profile 128 does not specify a location, and the first data 150 specifies a location, then the aggregator 112 may use that location. If the first user profile 128 does not specify a location, and the first data 150 does not specify a location, then the aggregator 112 may provide a default location. Of course, other combinations of user preferences (e.g., the user preferences 132, 138, or 144), user profiles (e.g., the user profiles 128 or 130), default locations provided by the issuers (e.g., the issuers 106, 108, or 110), or default locations provided by the aggregator 112 are possible.

Data (e.g., the data 150, 152, 154, or 156) stored by the aggregator 112 may include zero or more associated tags. The tags may be associated with the data by an issuer (e.g., the issuers 106, 108, or 110), by the aggregator 112, by the user preferences hosted by the issuer, by user preferences hosted by the aggregator 112, or any combination thereof. For example, the first issuer 106 may associate tags 160 with the first data 150 based on the first user preferences 134 before sending the first data 150 to the aggregator 112. As another example, the aggregator 112 may associate tags with the first data 150 based on the first user profile 128, based on default tags, or both.

In response to receiving a data item, such as the data 150, 152, 154 or 156, the aggregator 112 may send a notification 158 to the appropriate user. For example, the aggregator 112 may receive the first data 150 from the first issuer 106, place the first data 150 in the first user account 124, and send the notification 158 to the first user 116 to notify the first user 116 that the first data 150 has been stored in the first user account 124. As another example, in response to receiving the third data 154, the aggregator 112 may store the third data 154 in the second user account 126 and send the notification 158 to the second user 118. The notification 158 may notify the second user 118 that the aggregator 112 received the third data 154 and stored the third data 154 in the second user account 126. The notification 158 may include an email, a text message sent to a wireless phone, a telephone call made by an automated voice response system, a notification via an internet-based social networking site, another type of communication, or any combination thereof. The type of notification that is sent may be based on the user profiles 122. For example, the first user profile 128 may specify the conditions, which when satisfied, cause the aggregator 112 to send the notification 158 and may specify the method used to send the notification 158. For example, the first user 116 may specify in the first user profile 128 that the notification 158 is sent when data is received from a particular issuer and/or when tagged with a particular keyword. To illustrate, the first user 116 may specify in the first user profile 128 that data sent from the first issuer 106 and tagged with a first particular tag (e.g., "bank deposit") does not cause the notification 158 to be sent but that data tagged with a second particular tag (e.g., "overdrawn account") causes the notification 158 to be sent. As another example, the first user 116 may specify that data from the first issuer 106, a financial institution, causes a text message (cellular short message service) notification to be sent while data received from the second issuer 108, a healthcare provider, causes an email notification to be sent.

In some cases, a particular issuer may be unable to send data to the aggregator 112. In these cases, a user may create an account with the particular issuer that enables the user to log in to the account to access data associated with the user. The user may provide account credentials (e.g., user name, password, other account access-related information, and the like) associated with the account to the aggregator 112. The aggregator 112 may store the account credentials in the corresponding user profile of the user profiles 122. The user may specify (e.g., via the user profiles 122) a particular frequency or conditions when the aggregator 112 is to automatically login and retrieve the data associated with the user from the particular issuer. After retrieving the data, the aggregator 112 may store the retrieved data in the account associated with the user. In this way, the aggregator 112 may automatically retrieve and store documents from issuers that are unable to send data directly to the aggregator, thereby relieving users from the burden of having to manually retrieve the data and manually organize the data items.

A user may manually send documents to the aggregator 112 for storage in the account associated with the user. For example, if a particular issuer is unable to send data to the aggregator 112, the user may retrieve the data electronically or physically receive the data (e.g., in the form of a paper document). If the data is physically received, the user may convert the data to an electronic format, such as an image file or a portable document format. After converting physical data to an electronic format or if the data is retrieved electronically, the user may electronically send the data to the aggregator 112, in a manner similar to how an issuer sends data associated with the user to the aggregator 112 or via a separate user interface provided by the aggregator 112, such as a rich client or a web-based client. To illustrate, the user may retrieve the data from a website of the issuer, associate tags with the data, specify a location in the account of the user in which to store the data, encrypt the data, or any combination thereof, before sending the data to the aggregator 112. As another illustration, prior to obtaining an account with the aggregator 112, the user may retrieve and store electronic documents in a location that is accessible to the user, such as a computing device associated with the user. After the user obtains an account with the aggregator 112, the user may send at least a portion of these stored electronic documents to the aggregator 112 for storage in the user's account. In this situation, the user may be referred to as a "self-issuer."

The aggregator 112 may provide additional services to subscribers (e.g., the users 116 or 118), such as contact information (e.g., physical mailing address, phone number, etc.) confirmation or updates. For example, the user profiles 122 may include contact information, such as a home number, a cell phone number, a work number, a physical mailing address, and the like for each subscriber. To illustrate, the first user profile 128 may include contact information associated with the first user 116. If a subscribe moves from a first location to a second location, the subscriber may authorize the aggregator 112 to electronically notify the issuers associated with the subscriber that the subscriber has moved to the second location. For example, after the first user 116 moves from Dallas to Phoenix, the first user 116 may instruct the aggregator 112 to notify the issuers 106 and 108 associated with the first user 116 with new contact information for the first user 116. In addition, an issuer may send a request to the aggregator 112 to provide or confirm contact information associated with a particular user. The issuer may periodically send a request to the aggregator 112 to confirm whether a user has changed the user's contact information. The aggregator 112 may provide the user's contact information or confirm the user's contact information if the particular user has authorized the aggregator 112 to do so.

Thus, the aggregator 112 may receive multiple data items from multiple issuers. In some instances, the data received by the aggregator 112 may include confidential data, such as financial information, healthcare information, or government-issued information. The aggregator 112 may authenticate an identity of the issuer before placing at least a portion of the data in a user account associated with a user to prevent the user from receiving data from unauthorized issuers. The aggregator may automatically organize and maintain an account for the user by placing each of the multiple data items in particular locations of the account.

In this way, the user expends very little effort to organize and maintain the multiple data items in the account as compared to physically or electronically organizing and maintaining documents without the aggregator 112. The data items in a user account may be retained by the aggregator 112 until the user decides to delete them, or based on policies of the aggregator 112. For example, an amount in monthly or annual subscription that the aggregator 112 charges a user may be based at least partly on an amount of storage that the data in the user's account occupies. The user can access the information from any location that enables the user to access the network 114. The communication protocol between the issuer (e.g. 106, 108, 110) and the aggregator 112 via the network 114 may use conventional session-level protocols (e.g., SOAP/XML, SMTP, and the like) and/or transport level internet protocols (e.g., TCP/IP, UDP/IP, and the like). These communication protocols may be abstracted and made exportable via means such as an application programming interface (API) that may use the underlying session-level and transportation protocols. The aggregator 112 may offer a presentation layer based interface to the issuer 106 via a single sign-on (SSO) technology (or similar technology). For example, when the user 116 access a user interface via the issuer 106, the user interface may be temporarily redirected to the aggregator 112 to perform certain operations. The aggregator may also offer a presentation layer user interface via a rich-client or a web application to enable an issuer to manually send data to a user. A communication protocol between the user computing devices 102 and 104 and the aggregator 112 via the network 114 may use access protocols consistent with the nature of the communication component in the computing device (e.g., wired, wireless, and the like) and the nature of the access link between the computing devices 102 and 104 and the network 114. The aggregator 112 may enable issuers (e.g., the issuers 108, 108, or 110) to send data (e.g., the data 150, 152, 154, or 156) via one or more mechanisms, including but not limited to application programming interfaces (APIs), a web service, plug-in modules, or other mechanisms.

Figure 2:
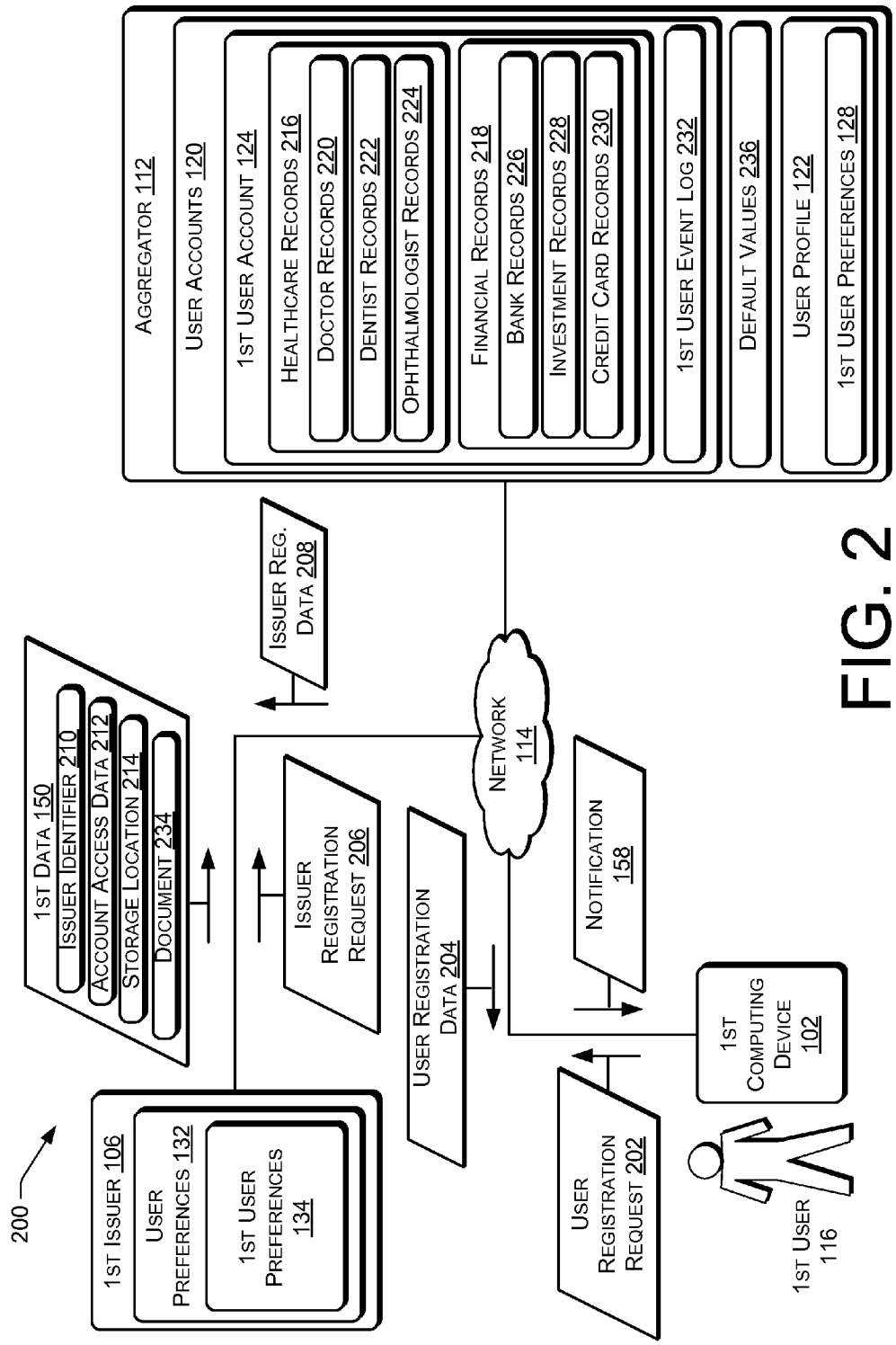
FIG. 2 illustrates an example framework in which an issuer registers with an aggregator according to some implementations.

FIG. 2 illustrates an example framework 200 in which an issuer registers with an aggregator according to some implementations. The first user 116 may desire to open an account with the aggregator 112. The first user 116 may send a user registration request 202 to the aggregator 112 to open an account with the aggregator 112. The user registration request 202 may be sent from the first computing device 102 via the network 114. In response, the aggregator 112 may send user registration data 204 to the first user 116. In addition, the aggregator 112 may create the first user account 124 and associate the first user account 124 with the first user 116.

The issuer 106 may register with the aggregator 112 to enable the issuer 106 to send data associated with users, such as clients of the first issuer 106. To register with the aggregator 112, the first issuer 106 may send an issuer registration request 206 to the aggregator 112. In response, the aggregator 112 may send the first issuer 106 issuer registration data 208. The issuer registration data 208 may include an issuer identifier that is associated with the issuer that enables the aggregator 112 to authenticate an identity of the first issuer 106.

The first user 116 may desire to have data provided by the first issuer 106 sent directly to the aggregator 112. The first user 116 may provide the first issuer 106 with at least a portion of the user registration data 204 to enable the first issuer 106 to access the first user account 124 associated with the first user 116. In some cases, when the first user 116 registers with the aggregator 112, the first user 116 may provide the aggregator 112 with issuer-related information, such as with which issuers the first user 116 is associated. The aggregator 112 may use the issuer-related information to instruct issuers to provide data associated with the first user 116 to the aggregator 112. For example, the first user 116 may provide the aggregator 112 with the names of financial institutions (e.g., with which the first user 116 has accounts) and account information, such as an account number, a type of account (e.g., checking savings, credit card and the like), other account-related information (e.g., social security number), or any combination thereof. The aggregator 112 may automatically notify issuers, such as the first issuer 106, that the first user 116 has authorized the aggregator 112 to receive data associated with the first issuer 106 from the issuers. The aggregator 112 may provide the issuers with account-related information specifying the accounts associated with the first user 116 for which the aggregator 112 is to receive data.

When the first issuer 106 sends the first data 150 to the aggregator 112, the first data 150 may include the issuer identifier 210, account access data 212, a storage location 214, other information (e.g. tags) or any combination thereof. In response to receiving the first data 150, the aggregator 112 may authenticate an identity of the first issuer 106 based on the issuer identifier 210. The aggregator 112 may use the account access data 212 to identify the first user account 124 associated with the first user 116. Based on the storage location 214, the aggregator 112 may place a portion of the first data 150 into an appropriate location of the first user account 124.

The first user account 124 may include multiple records containing multiple data items organized in a hierarchical structure. For example, at a first level, the first user account 124 may include healthcare records 216 and financial records 218. Additional directories may be placed at a second level that is hierarchically below the first level. For example, the healthcare records 216 may include doctor records 220, dentist records 222, or ophthalmologist records 224. For example, the doctor records 220 may include records received from a healthcare issuer that include doctor-provided data associated with the first user 116. The dentist records 222 may include dentist-provided data associated with the first user 116. The ophthalmologist records 224 may include data provided by an eye doctor for whom the first user 116 is a patient.

The financial records 218 may similarly include additional lower level directories. For example, the financial records 218 may include bank records 226, investment records 228, credit card records 230, other financial record directories, or any combination thereof. The bank records 226 may be used to store data provided by financial institutions where the first user 116 has bank accounts. The investment records 228 may be used to store investment records provided by financial institutions where the first user 116 has investment accounts. The credit card records 230 may include additional directories, such as credit card records provided by one or more credit card merchants with which the first user 116 has an account.

The aggregator 112 may also include a first user event log 232 associated with the first user account 124. The first user event log 232 may enter a log into the first user event log 232 when particular events occur, such as when data is received from an issuer. The log may include a time stamp associated with when the data was received, a location identifier identifying a particular location where the data was stored, an issuer identifier, other information related to when data is received and/or stored, or any combination thereof.

The aggregator 112 may include default values 236 that specify various defaults, such as a default location to store data. For example, when the first user 116 registers with the aggregator 112, the first user 116 may provide account information associated with accounts that the first user 116 has with one or more issuers. The aggregator 112 may create an initial hierarchical account structure based on the account information provided by the first user 116 and based on the default values 236. For example, one or more of the healthcare records 216, the financial records 218, the doctor records 220, the bank records 226, the investment records 228, or the credit card records 230 may be default locations that are automatically created when the aggregator 112 creates a particular user account. After the default hierarchical account structure is created, the first user 116 may modify the structure to suit their specific needs. In response, the aggregator may physically and/or logically organize the data to reflect the new user specified structure.

In operation, the aggregator 112 may receive the first data 150 from the first issuer 106. The aggregator 112 may authenticate the first issuer 106 based on the issuer identifier 210. In response to determining that the issuer 106 is authorized to provide the data for the first user 116, the aggregator 112 may identify the first user account 124 that is associated with the first user 116. In addition, if configured by the user, the aggregator 112 may authenticate a restricted public key that the issuer provides in the first data 150. If the aggregator 112 cannot authenticate the restricted public key provided by the issuer, the aggregator 112 may reject the first data 150 to prevent storing an unauthorized communication (e.g., "spam"). If the aggregator 112 authenticates the restricted public key provided by the issuer, the aggregator 112 may store at least a portion of the first data 150 in the first user account 124 that is associated with the first user 116 based on the storage location identifier 214. For example, when the first issuer 106 is a credit card provider, the storage location 214 may specify that the first data 150 is to be stored in the credit card records 230. As another example, when the first issuer 106 is a doctor, the storage location 214 may instruct the aggregator 112 to store the first data 150 in the doctor records 220. The portion of the first data 150 that is stored may include document 234. For example, the document 234 may be a financial statement, a healthcare statement, or a document issued by a governmental agency (e.g., at the city, state, or Federal level). In some instances, at least a portion of the first data 150 may be encrypted. In response to determining that the first data 150 is encrypted, the aggregator 112 may decrypt the first data 150 before storing the first data 150 in the first user account 124.

A particular user may have relationships with several different types of issuers. A first type of issuer may regularly (e.g., periodically or based on predetermined conditions) may issue documents associated with the user. The first type of issuer may be known as a "regular issuer" or an "auto-issuer" because the issuer regularly and/or automatically sends data associated with the user to the aggregator 112. An auto-issuer may chose a programming application programming interface (API) that is either provided by the aggregator 112 or provided by the issuer. The API may enable a particular issuer to send data automatically (e.g., without human interaction) to one or more user accounts hosted by the aggregator 112.

A second type of issuer may have a non-regular relationship with the user because the issuer does not regularly generate data associated with the user. For example, the user may travel for business and the user's employer may require the user to submit an expense report for expense reimbursement. As part of the travel, the user may stay at a hotel or eat at a restaurant that the user does not regularly frequent. For example, the hotel or restaurant may be located in a different location (e.g., different city, different state, different country, etc.) from where the user lives. The user may provide the second type of issuer with account access information to enable the second type of issuer to send data associated with one or more transactions to the aggregator 112. The second type of issuer may not store the account information (e.g., in a user preferences file) for the user because the second type of issuer may not have an on-going relationship with the user. The second type of issuer may be known as a "manual issuer" or a "non-regular issuer." The manual-issuer may use a rich client or a web based application that the aggregator 112 provides to enable the manual issuer to select the data to be sent to the user's account at the aggregator 112. The manual issuer may include a restricted public key provided by the user in the data that is sent to the aggregator. Data received from a manual issuer that does not include the user's restricted public key may be considered unwanted (e.g., "spam") or unauthorized data by the aggregator 112 and the aggregator 112 may reject the data or store it in a spam directory in the user's account to enable the user to confirm whether the issuer is an authorized issuer or an unauthorized issuer. Another form manual issuer may be the "self-issuer", where the issuer and the user to whom the data is being sent are the same person.

Hierarchical Structure of a User Account

Figure 3:
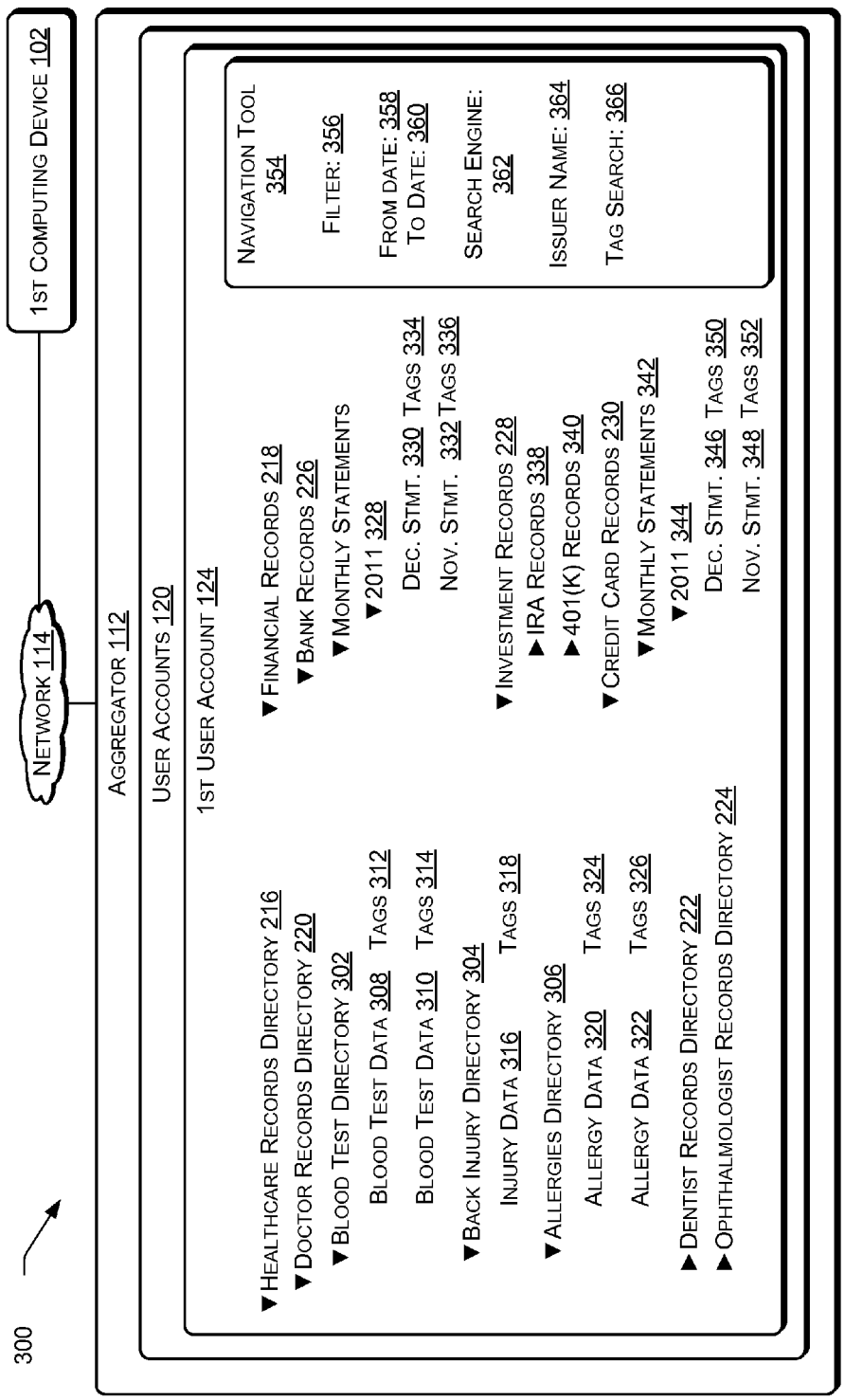
FIG. 3 illustrates an example of a user account structure according to some implementations.

FIG. 3 illustrates an example of a framework 300 that includes a user account structure according to some implementations. For example, the first user 116 may see an account structure that is similar to what is illustrated in FIG. 3 when the first user 116 logs into the first user account 124.

As illustrated in FIG. 3, a highest level of the first user account 124 includes the healthcare records directory 216 and the financial records directory 218. The healthcare records directory 216 may include the doctor records directory 220, the dentist records directory 222, and the ophthalmologist records directory 224. The doctor records directory 220 may include additional directories, such as a blood test records directory 302, a back injury directory 304, and an allergies directory 306. For example, the blood test directory 302 may be used as a location to store data associated with the results of blood tests ordered by a particular doctor. For example, the blood tests may be organized by date and time, such as an ascending or descending order, based on the date. The blood test directory 302 may include blood test data 308 and blood test data 310. The blood test data 308 may include data from a blood test that was performed on a first particular date. The blood test data 310 may include data from a blood test that was performed on a second particular date. The blood test data 308 may have one or more tags 312 associated with it (e.g., "fasting glucose", "white cell count" and the like). The blood test data 310 may have one or more associated tags 314. The tags 312 or 314 may be associated with the blood test data 308 or 310 by the issuer (e.g., based on user preferences, such as the user preferences 134, 136, 140, 142, 146, or 148), by the aggregator 112 (e.g., based on the user profiles 122), or both. The back injury 304 directory may include injury data 316, such as x-rays, magnetic resonance imaging, or other related data, and have associated tags 318. The allergies directory 306 may include allergy data 320 and allergy data 322. The allergy data 320 may have associated tags 324 and the allergy data 322 may have associated tags 326.

The financial records 218 may include lower-level directories, such as the bank records 226 directory, the investment records 228 directory, and the credit card records 230 directory. The locations 226, 228, and 230 may include additional lower-level directories. For example, the bank records 226 may include monthly statements 328. The monthly statements 328 may include a December statement 330 and a November statement 332. The December statement 330 may have associated tags 334 and the November statement 332 may have associated tags 336. The investment records 228 may include additional directories, such as Individual Retirement Account (IRA) records 338 and 401(K) records 340. The credit card records 230 may include a December statement 346 and a November statement 348. The December statement 346 may have associated tags 350 and the November statement 348 may have associated tags 352.

The first user account 124 may include a navigation tool 354 that enables the user to sort, filter, or search data items stored in the first user account 124. For example, the navigation tool 354 may include a filter 356, a from-date 358, a to-date 360, search engine 362 an issuer name 364, and a tag search 366. Of course, the navigation tool 354 may include other types of navigational tools instead of or in addition to those illustrated in FIG. 3. The navigation tool 354 may enable the user to filter data items in the first user account 124 based on a date range, such as between the from-date 358 to the to-date 360. For example, the user may be able to identify data items stored in the last twenty-four hours, in the last week, in the last month, in the last quarter, in the last year, and the like.

The search engine 362 may enable the user to enter one or more search terms to identify particular data items that match the search terms and that are stored in the first user account 124. For example, the search engine 362 may be used to search for the name of a particular data item or the contents of a particular data item. The issuer name 364 may enable the user to enter an issuer identifier to display data items received from specified issuers. The tag search 366 may enable the user to enter particular tags to be used to search and display data items that include those particular tags. In particular, the tags may enable the user to associate tags that are meaningful to the user and use the tags to filter and search the data. Because the tags are meaningful to the user, the user may be able to navigate, filter, and/or search the contents of the user's account more easily than if the user has to try and remember terms in the documents that are provided by the issuer of the documents.

Thus, a user account provided by the aggregator 112 may be hierarchically organized and used to store data items received from multiple issuers. The user account may provide navigational tools that enable the user to search or filter the items stored in the user account and display only those data items that match the specified criteria.

Modular Software Architecture

Figure 4:
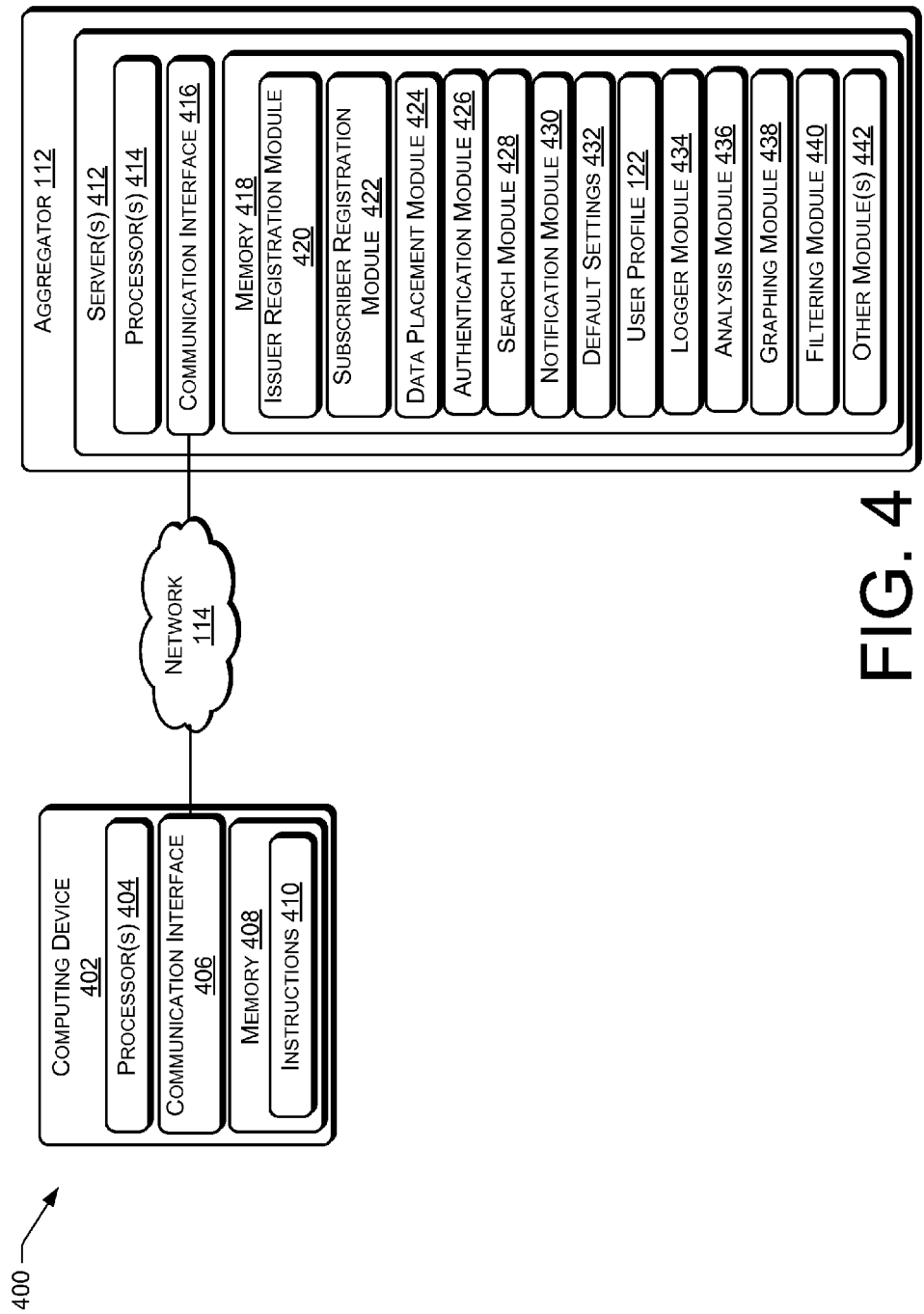
FIG. 4 illustrates an example framework to aggregate data according to some implementations.

FIG. 4 illustrates an example framework 400 to aggregate data according to some implementations. The framework 400 includes a computing device 402 coupled to the aggregator 112 via the network 114. The computing device 402 may include one or more processors 404, a communications interface 406 and a memory 408. The memory 408 may include instructions 410 that are executable by the processors 404 to perform one or more functions provided by the computing device 402. For example, the first computing device 102, the second computing device 104, the first issuer 106, the second issuer 108, or the third issuer 110 may include the computing device 402.

The aggregator 112 may include one or more servers 412. Each of the servers 412 may include one or more processors 414, a communication interface 416, and a memory 418 The communication interface 416 may enable the aggregator 112 to communicate with issuers and users via the network 114.

The memory 418 may include various modules that include instructions executable by the one or processors 414 to perform the various functions of the aggregator 112. For example, the memory 418 may include an issuer registration module 420, a subscriber registration module 422, a data placement module 424, an authentication module 426, a search module 428, a notification module 430, a default settings 432, the user profile 122, a logger module 434, an analysis module 436, a graphing module 438, a filtering module 440, other modules 442, or any combination thereof.

The issuer registration module 420 may be used to receive a registration request from an issuer and to send issuer registration data that includes an issuer identifier. The subscriber registration module 422 may be used to register users. For example, the subscriber registration module 422 may receive a registration request from a user. In response, the subscriber registration module 422 may create a user account for the user and provide user account data to the user to enable the user to access the user's account. The data placement module 424 may determine where to place a particular data item that is received from an issuer. For example, the data placement module 424 may use the storage location 214, the user profile 122, or other user preferences to determine a location to store data. The authentication module 426 may be used to authenticate an issuer, such as one of the issuers 106, 108 or 110 when the issuer sends data to the aggregator 112 or to authenticate a user, such as the users 116 or 118, when the user logs in to manage their account.

The search module 428 may enable a user to search the user's account to identify items that match the search criteria. The notification module 430 may send a notification, such as the notification 158, to a user in response to the aggregator receiving and/or storing a data item. The notification 158 may be sent when conditions specified in a user profile associated with the user, such as the user profile 122, are satisfied. The default settings 432 may be used to provide default settings for users when an account is initially created. The default settings 432 may also identify default locations to store data. The default settings 432 may be overridden by the user profile or the user preferences. The logger module 434 may be used to generate a log events when the aggregator 112 performs an action, such as receiving data, storing data, deleting data, moving data, and other account-related actions. For example, when the aggregator performs an action with data associated with the first user 116, the logger module 434 may generate a log and store the log in the first user event log 232.

The analysis module 436 may analyze at least a portion of the data items in a user account. For example, the analysis module 436 may keep metrics associated with data received by each user, such as the number of files received from auto issuers, the number of files received from manual issuers, the number of files received from financial institutions etc. As an another example, the analysis module 436 may be used to analyze the performance of a stock portfolio over a specified period of time, track doctor visits over a specified period of time, track vehicle maintenance over a specified period of time, etc. For example, the analysis module 436 may analyze the records associated with the maintenance of a vehicle to determine when it would be cheaper for the user to buy a new car then to continue maintenance of an older car. The graphing module 438 may be used to graph the output of the analysis module 436. For example, the graphing module 438 may display a graph of the performance of a stock portfolio of a user. The filtering module 440 may be used to filter data items based on tags, data ranges, or other user specified criteria. The other modules 442 may implement other functions and services that the aggregator 112 may offer.

The processors 404 or 414 may be a single processing unit or a number of processing units, all of which may include single or multiple computing units or multiple cores. The processors 404 or 414 can be implemented as one or more microprocessors, microcomputers, microcontrollers, digital signal processors, central processing units, state machines, logic circuitries, and/or any devices that manipulate signals based on operational instructions. Among other capabilities, the processors 404 or 414 can be configured to fetch and execute computer-readable instructions stored in the memory 408 or 418, mass storage devices, or other computer-readable media.

Memory 408 and 418 are examples of computer storage media for storing instructions which are executed by the processors 404 and 414 to perform the various functions described above. For example, memory 408 and 418 may generally include both volatile memory and non-volatile memory (e.g., RAM, ROM, or the like) as well as, mass storage devices, such as hard disk drives, solid-state drives, removable media, including external and removable drives, memory cards, flash memory, floppy disks, optical disks (e.g., CD, DVD), a storage array, a network attached storage, a storage area network, or the like. Both the memory 408 and 418 and mass storage devices may be collectively referred to as memory or computer storage media herein, and may be a non-transitory media capable of storing computer-readable, processor-executable program instructions as computer program code that can be executed by the processors 404, 414 as a particular machine configured for carrying out the operations and functions described in the implementations herein.

The communication interfaces 406 and 416 can facilitate communications within a wide variety of networks and protocol types, including wired networks (e.g., LAN, cable, etc.) and wireless networks (e.g., WLAN, cellular, satellite, etc.), the Internet and the like. Communication interfaces 406 and 416 can also provide communication with external storage (not shown), such as in a storage array, network attached storage, storage area network, or the like.

Example User Interface

Figure 5:
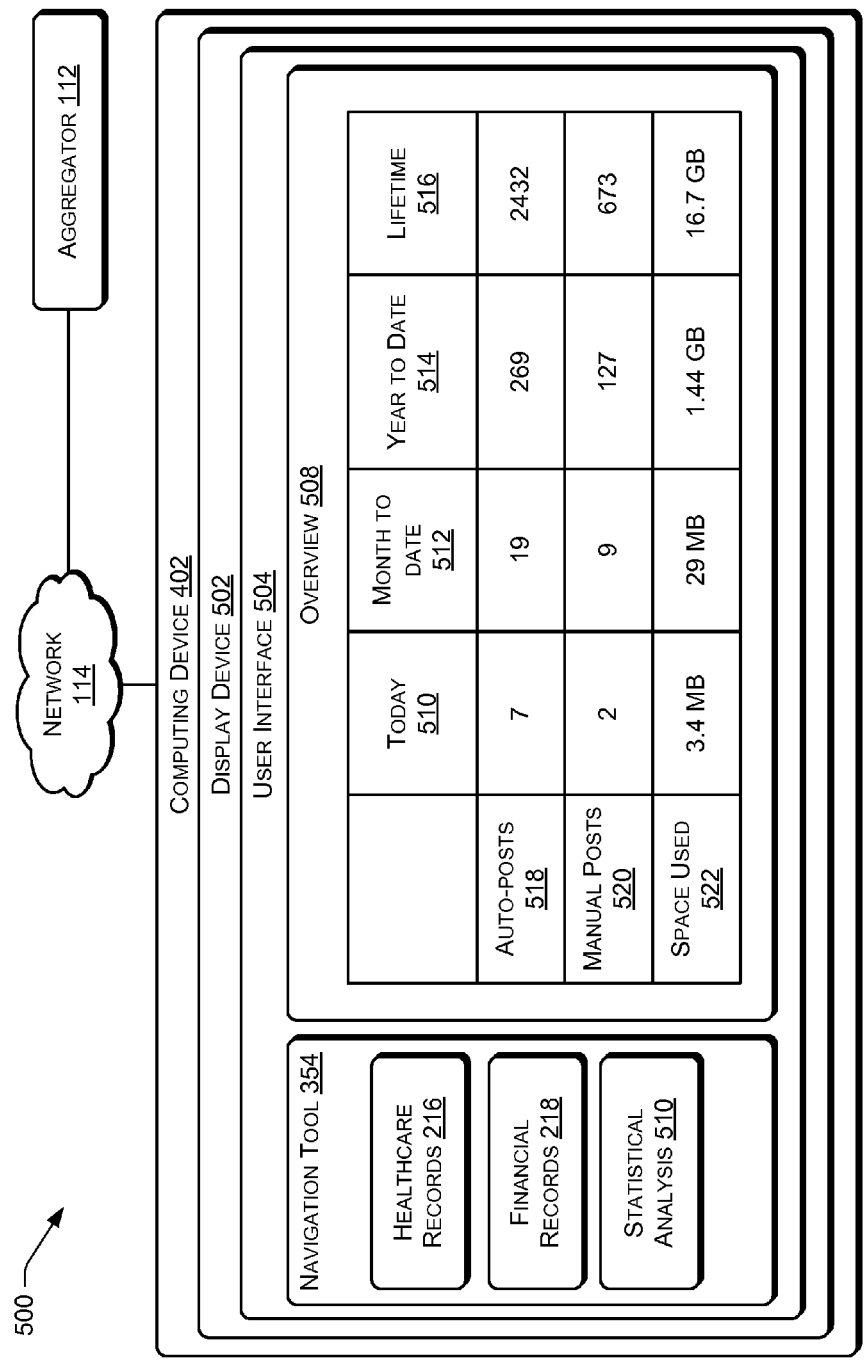
FIG. 5 illustrates an example graphical user interface provided by an aggregator according to some implementations.

FIG. 5 illustrates an example framework 500 that includes a graphical user interface according to some implementations. The framework 500 may include the computing device 402 coupled to the aggregator 112 via the network 114. The computing device 402 may be coupled to a display device 502. The display device 502 may display a user interface 504.

The user interface 504 may include the navigation tool 354 and an overview 508. The navigation tool 354 may enable the user to navigate to a particular logical or physical location such as a subdirectory, a particular area, such as the healthcare records 216, the financial records 218, or to provide a statistical analysis 510 of a selected directory.

The overview 508 may include today 510, month-to-date 512, year-to-date 514 and lifetime 516. The overview 508 may display a number of auto-posts 518 stored in the user account based on today's date 510 for the entire month until today. For example, the auto-posts 518 may be generated by regular issuers. The manual posts 520 may identify data that has been manually posted to the user account. For example, the manual posts 520 may be generated by non-regular issuers. The space used 522 may identify an amount of storage space occupied by the items in the user account.

Furthermore, while FIGS. 1-5 set forth examples of suitable architectures that include an aggregator 112, numerous other possible architectures, frameworks, systems and environments will be apparent to those of skill in the art in view of the disclosure herein. Additionally, while the examples herein have been described in the environment of data aggregation, other implementations may be directed to other types of data aggregation. Thus, the implementations herein may be extended to other types of data aggregation applications.

Example Processes

Figure 6:
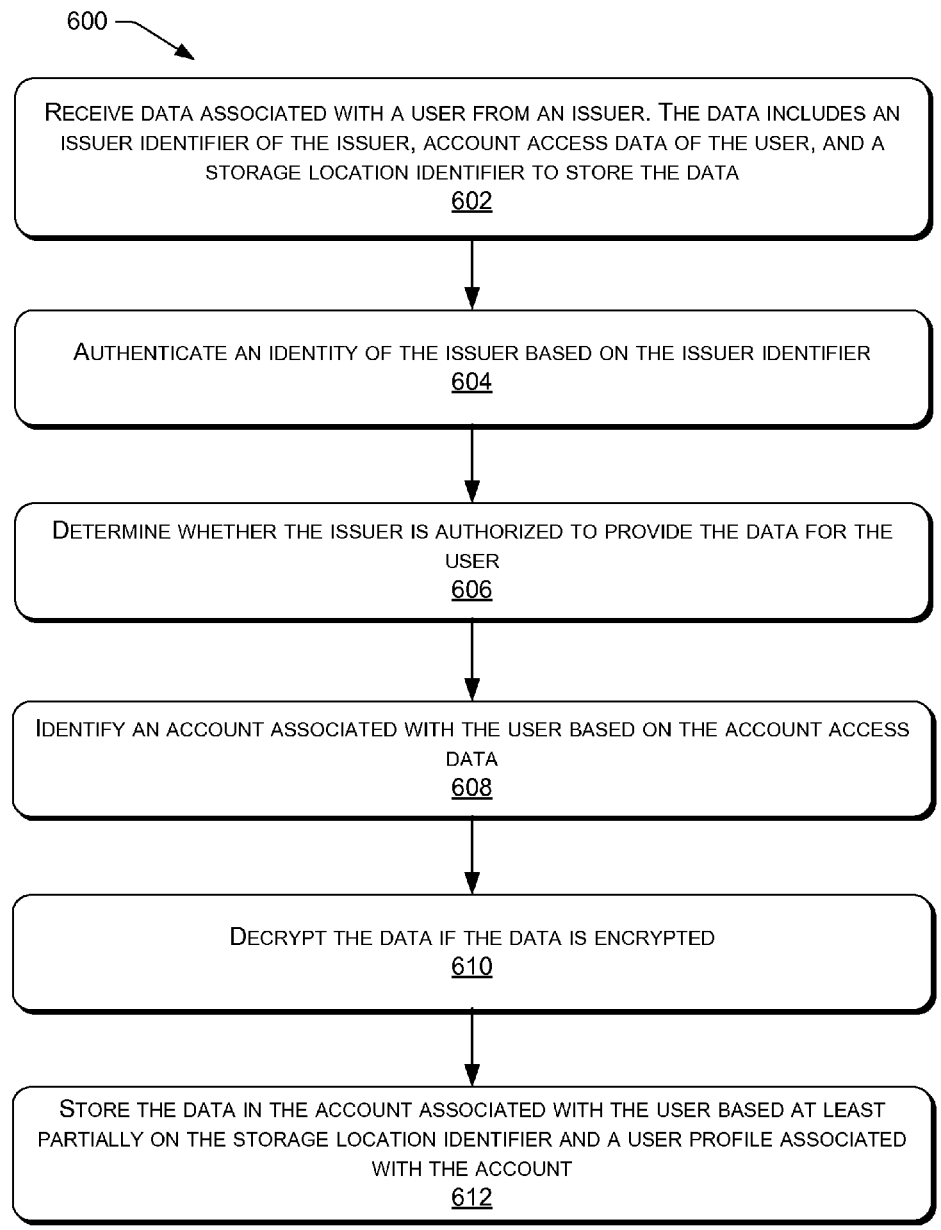
FIG. 6 is a flow diagram of a first implementation of a process to aggregate data according to some implementations.
Figure 7:
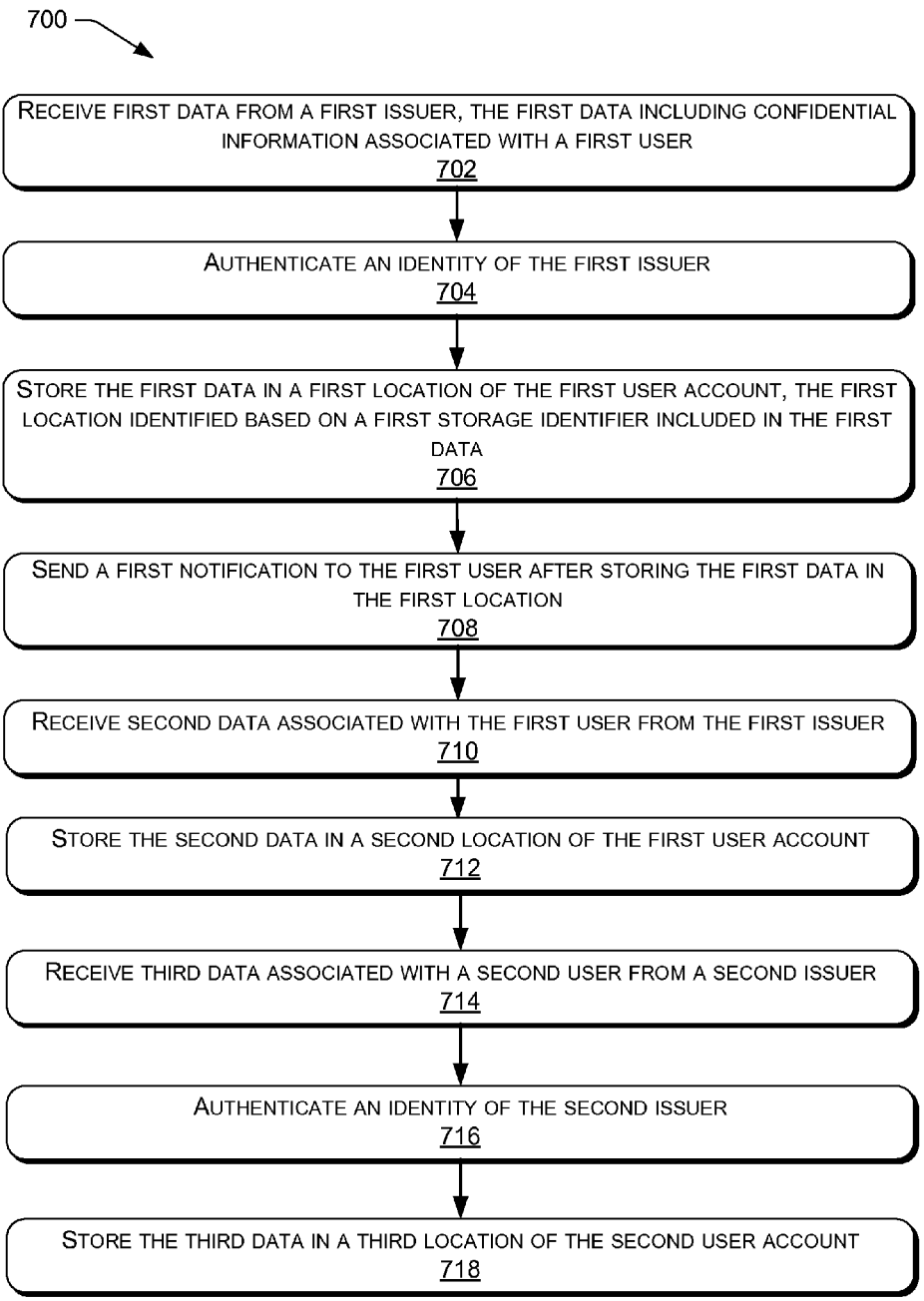
FIG. 7 is a flow diagram of a second implementation of a process to aggregate data according to some implementations.
Figure 8:
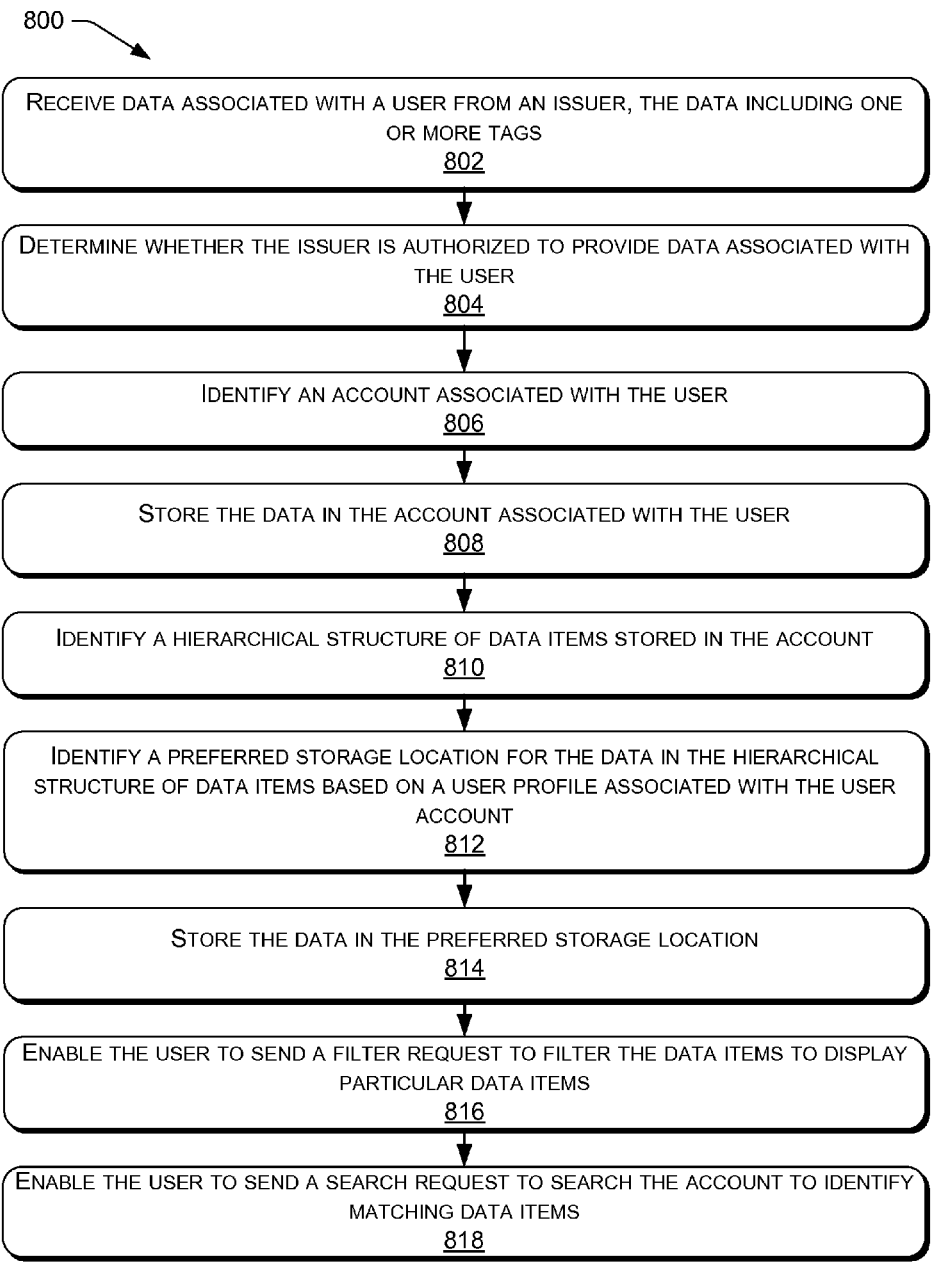
FIG. 8 is a flow diagram of a third implementation of a process to aggregate data according to some implementations.

In the flow diagrams of FIGS. 6, 7, and 8, each block represents one or more operations that can be implemented in hardware, firmware, software, similar or equivalent mechanisms or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700 and 800 are described with reference to the architectures 100, 200, 300, 400, and 500, respectively, as described above, although other models, frameworks, systems and environments may implement these processes.

FIG. 6 is a flow diagram of a first implementation of a process 600 to aggregate data according to some implementations. The process 600 may be performed by the aggregator 112 of FIGS. 1-5.

At 602, data associated with a user is received from an issuer. The data may include an issuer identifier associated with the issuer, account access data associated with the user, a storage location identifier to store the data, or any combination thereof.

At 604, an identity of the issuer is authenticated based on the issuer identifier. For example, the aggregator 112 may authenticate an identity of the first issuer 106 based on the issuer identifier 210.

At 606, a determination is made whether the issuer is authorized to provide the data for the user. For example, the aggregator 112 may determine whether the first issuer 106 is authorized to provide the data 150 for the first user 116. This authorization may include the use of a restricted public key as described herein. If the aggregator 112 determines that the first issuer 106 is not authorized to provide the data 150, the aggregator 112 may refuse to receive the data 150, send the notification 158 to the issuer 106, the first user 116, or both.

At 608, an account associated with the user may be identified based on the account access data. For example, the aggregator 112 may identify the first user account 124 based on the account access data 212 of the first data 150.

At 610, a determination is made whether the data is encrypted and the data is decrypted if the data we encrypted by the issuer. For example, the aggregator 112 may determine whether the first data 150 is encrypted. If the first data 150 is encrypted, the aggregator 112 may decrypt the first data 150 before storing the first data 150 in the first user account 124.

At 612, the data is stored in the account associated with the user based at least partially on the storage location identifier and a user profile associated with the account. For example, the aggregator 112 may store the first data 150 in a location of the first user account 124 based on the storage location 214 and the user profile 122. The file stored by the aggregator 112 may be encrypted based on a private key that may be configured by the user 116.

FIG. 7 is a flow diagram of a first implementation of a process 700 to aggregate data according to some implementations. The process 700 may be performed by the aggregator 112 of FIGS. 1-5.

At 702, first data is received from a first issuer. The first data may include confidential information associated with a first user. For example, in FIG. 1, the aggregator 112 may receive the first data 150 that includes confidential information associated with the first user 116.

At 704, an identity of the first issuer is authenticated. For example, in FIG. 2, the aggregator 112 may authenticate an identity of the first issuer 106 based on the issuer identifier 210.

At 706, the first data is stored in a first location of the first user account. The first location may be identified based on a first storage identifier (e.g., a suggestion and/or an instruction) included in the first data. For example, in FIG. 2, the aggregator 112 may store the first data 150 in a first location based on the storage location 214.

At 708, a first notification is sent to the first user after storing the first data in the first location. For example, in FIG. 2, the aggregator 112 may send the notification 158 to the first user 116 after storing the first data 150. The notification may include information associated with the action taken (e.g., storing the data), such as an identity of the issuer that sent the data, a timestamp identifying when the data was received and/or stored in the user account, one or more tags associated with the data, other information related to the data, or any combination thereof. In some cases, the notification may include at least a portion of the data received from the issuer. For example, the notification may include the first page of the document in the form of an image or a portable document format (PDF) file.

At 710, second data associated with the first user is received from the first issuer. At 712, the second data may be stored in a second location of the first user account. For example, in FIG. 1, the aggregator 112 may receive the second data 152 associated with the first user 116 from the first issuer 106 and may store the second data 152 in a second location of the first user account 124.

At 714, third data associated with a second user may be received from a second issuer. At 716, an identity of the second issuer may be authenticated. At 718, the third data may be stored in a third location of the second user account. For example, in FIG. 1, the aggregator 112 may receive the third data 154 from the second issuer 108, determine that the third data 154 is associated with the second user 118, and store the third data 154 in the second user account 126.

FIG. 8 is a flow diagram of a first implementation of a process 800 to aggregate data according to some implementations. The process 800 may be performed by the aggregator 112 of FIGS. 1-5.

At 802, data associated with a user is received from an issuer. The data may include one or more tags. For example, the aggregator 112 may receive the first data 150 from the first issuer 106 that includes the one or more tags 160.

At 804, a determination is made whether the issuer is authorized to provide data associated with the user. For example, in FIG. 2, the aggregator 112 may determine whether the first issuer 106 is authorized to provide the first data 150 on behalf of the first issuer 116 based on the issuer identifier 210.

At 806, an account associated with the user is identified. At 808, the data may be stored in the account associated with the user. For example, in FIG. 2, the aggregator 112 may identify the first user account 124 based on the account access data 212 and may store the first data 150 in the first user account 124 associated with the first user 116.

At 810, a hierarchical structure of data items stored in the account may be identified. For example, the aggregator 112 may identify the hierarchical structure of items in the user account 124, as illustrated in FIG. 3.

At 812, a preferred storage location for the data is identified in the hierarchical structure of data items based on a user profile associated with user accounts. At 814, the data may be stored in the preferred storage location. For example, in FIG. 1, the aggregator 112 may identify a location in the hierarchical structure of data items based on the first user profile 128 and store the data 150 in the first user account 124.

At 816, the aggregator may enable the user to send a filter request to filter the data items to display particular data items. In response to receiving the filter request, the aggregator may filter data items in the user account to display the particular data items. At 818, the aggregator may enable the user to send a search request to search the account to identify matching data items. For example, the navigation tool 354 of FIG. 3 may enable the user to send a filter request or a search request to the aggregator 112 to identify matching data items in the account associated with the user.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
receiving, by an aggregator via a network, first data from a first issuer, the first data including:
confidential information associated with a user;
an account identifier to enable the first issuer to access an account hosted by the aggregator that is associated with the user, the account identifier including at least a portion of user registration data provided to the user when the user initially registered with the aggregator; and
an issuer identifier associated with the first issuer;
authenticating an identity of the first issuer based on the issuer identifier;
determining whether the first issuer is authorized to provide the first data based at least in part on the account identifier and the issuer identifier;
in response to determining that the first issuer is authorized to provide the first data, identifying the account associated with the user based on the account identifier;
in response to determining, based on a type of the first data, that the first data is to be stored using a hierarchical structure, determining whether the account includes the hierarchical structure;
in response to determining that the account does not include the hierarchical structure, automatically creating the hierarchical structure within the account based on the type of the first data;
in response to determining that the account includes a user-specified location provided by the user, storing the first data in the account based on the user-specified location;
in response to determining that the account does not include the user-specified location, determining whether the first data includes a first storage location identifier;
in response to determining that the first data includes the first storage location identifier, storing the first data in a first location within the account based on the first storage location identifier;
in response to determining that the first data does not include the first storage location identifier, storing the data in a default location in the account;
receiving, by the aggregator via a network, second data from a second issuer, the second data including the account identifier to indicate that the second data is associated with the user, wherein the second issuer is an auto-issuer that sends user data to the aggregator using an application programming interface (API) provided by one of the aggregator or the auto-issuer, the API enabling the auto-issuer to automatically send the user data to multiple user accounts hosted by the aggregator; and
in response to authenticating the identity of the second issuer based at least partly on the account identifier, storing the second data in a second location within the account based on a second storage location identifier included in the second data, the second location used to store data received from the second issuer.

2. The method of claim 1, further comprising:
determining whether the first data is encrypted; and
in response to determining that the first data is encrypted, decrypting the first data before storing the first data in the account.

3. The method of claim 1, wherein:
the first data comprises (i) information associated with the user and (ii) a first set of tags associated with the data, the first set of tags provided by the issuer.

4. The method of claim 3, the method further comprises:
associating a second set of tags with the data based on user preferences associated with the account, the first and second set of tags searchable by a search engine provided by the aggregator, individual tags from the first and second set of tags identifying a characteristic of the first data.

5. The method of claim 1, wherein:
the issuer identifier comprises a key associated with the user,
the key including identification data to enable the aggregator to automatically authenticate the first issuer, the aggregator automatically storing the data in the account in response to successfully authenticating the first issuer using the key.

6. The method of claim 5, wherein the user provides the key to the first issuer before the first issuer sends the data to the aggregator, the aggregator rejecting other data received from other issuers when the other data does not include the key.

7. The method of claim 1, further comprising:
before storing the first data, automatically associating one or more tags with the first data.

8. The method of claim 7, wherein the one or more tags are selected at least partly based on a user profile associated with the user, the user profile hosted by the aggregator server.

9. An aggregator server comprising:
one or more processors; and
one or more non-transitory computer-readable media including instructions that are executable by the one or more processors to perform operations comprising:
receiving first data from a first issuer via a network, the first data including:
confidential information associated with a user;
an account identifier to enable the first issuer to access an account hosted by the aggregator server that is associated with the user, the account identifier including at least a portion of user registration data provided to the user when the user initially registered with the aggregator server; and
an issuer identifier associated with the first issuer;
authenticating an identity of the first issuer based on the issuer identifier;
determining whether the first issuer is authorized to provide the first data based at least in part on the account identifier and the issuer identifier;
in response to determining that the first issuer is authorized to provide the first data, identifying the account associated with the user based on the account identifier;

in response to determining, based on a type of the first data, that the first data is to be stored using a hierarchical structure, determining whether the account includes the hierarchical structure;

in response to determining that the account does not include the hierarchical structure, automatically creating the hierarchical structure within the account based on the type of the first data;

in response to determining that the account includes a user-specified location provided by the user, storing the first data in the account based on the user-specified location;

in response to determining that the account does not include the user-specified location, determining whether the first data includes a first storage location identifier;

in response to determining that the first data includes the first storage location identifier, storing the first data in a first location within the account based on the first storage location identifier;

in response to determining that the first data does not include the first storage location identifier, storing the data in a default location in the account;

receiving, by the aggregator via a network, second data from a second issuer, the second data including the account identifier to indicate that the second data is associated with the user, wherein the second issuer is an auto-issuer that sends user data to the aggregator server using an application programming interface (API) provided by one of the aggregator server or the auto-issuer, the API enabling the auto-issuer to automatically send the user data to multiple user accounts hosted by the aggregator server; and in response to authenticating the identity of the second issuer based at least partly on the account identifier, storing the second data in a second location within the account based on a second storage location identifier included in the second data, the second location used to store data received from the second issuer.

10. The aggregator server of claim 9, the operations further comprising:

receiving a user registration request from the user;
registering the user at the aggregator server;
creating the account and the account identifier corresponding to the account; and
providing, to the user, user registration data including the account identifier.

11. The aggregator server of claim 9, the operations further comprising:

receiving, at the aggregator server, a registration request from the first issuer;
determining whether the first issuer is authorized to send user data to the user based at least partially on the registration request; and
in response to determining that the first issuer is authorized to send the user data to the user, registering the first issuer at the aggregator server to enable the first issuer to send the user data to the account associated with the user.

12. The aggregator server of claim 11, the operations further comprising:

determining a user notification preference based on a user profile associated with the user; and
after storing the second data in the second location, sending a notification to the user based on the user notification preference.

13. The aggregator server of claim 9, wherein:
the first issuer comprises the user; and
the first data is received from another account associated with the user.

14. The aggregator server of claim 9, further comprising:
determining whether the first data is encrypted; and
in response to determining that the first data is encrypted, decrypting the first data before storing the first data in the account.

15. One or more non-transitory computer-readable media to store instructions executable by one or more processors to perform operations comprising:

receiving, by an aggregator via a network, first data from a first issuer, the first data including:
confidential information associated with a user;
an account identifier to enable the first issuer to access an account hosted by the aggregator that is associated with the user, the account identifier including at least a portion of user registration data provided to the user when the user initially registered with the aggregator; and
a first issuer identifier associated with the first issuer;
authenticating an identity of the first issuer based on the first issuer identifier;
determining whether the first issuer is authorized to provide the first data based at least in part on the account identifier and the first issuer identifier;
in response to determining that the first issuer is authorized to provide the first data, identifying the account associated with the user based on the account identifier;
in response to determining, based on a type of the first data, that the first data is to be stored using a hierarchical structure, determining whether the account includes the hierarchical structure;
in response to determining that the account does not include the hierarchical structure, automatically creating the hierarchical structure within the account based on the type of the first data;
in response to determining that the account includes a user-specified location provided by the user, storing the first data in the account based on the user-specified location;
in response to determining that the account does not include the user-specified location, determining whether the first data includes a first storage location identifier;
in response to determining that the first data includes the first storage location identifier, storing the first data in a first location within the account based on the first storage location identifier;
in response to determining that the first data does not include the first storage location identifier, storing the data in a default location in the account;
receiving, by the aggregator via a network, second data from a second issuer, the second data including the account identifier to indicate that the second data is associated with the user, wherein the second issuer is an auto-issuer that sends user data to the aggregator using an application programming interface (API) provided by one of the aggregator or the auto-issuer, the API enabling the auto-issuer to automatically send the user data to multiple user accounts hosted by the aggregator; and
in response to authenticating the identity of the second issuer based at least partly on the account identifier, storing the second data in a second location within the account based on a second storage location identifier included in the second data, the second location used to store data received from the second issuer.

16. The one or more non-transitory computer-readable media of claim 15, wherein the first data comprises an email addressed to an email address associated with the user.

17. The one or more non-transitory computer-readable media of claim 15, wherein the operations further comprise:
    receiving, from the user, a filter request to filter a set of items stored within the account, the filter request including one or more filtering criteria;
    identifying at least one item from the set of items based on the one or more filtering criteria; and
    displaying the at least one item.

18. The one or more non-transitory computer-readable media of claim 17, wherein the one or more filter criteria comprise at least one of a date, an issuer identifier, or a data type.

19. The one or more non-transitory computer-readable media of claim 15, wherein the operations further comprise:
    receiving a search request from the user, the search request including one or more search terms and at least one tag;
    identifying one or more items in the account corresponding to the user based on the one or more search terms and the at least one tag; and
    displaying the one or more items.

20. The one or more non-transitory computer-readable media of claim 15, wherein the operations further comprise:
    receiving, from the first issuer, a request to provide contact information associated with the user, the contact information including at least one of an email address, a mailing address, or a phone number;
    determining, based on a user profile associated with the user, that the user has authorized providing the contact information to the issuer;
    retrieving current contact information associated with the user from the user profile; and sending the current contact information associated with the user to the first issuer.

* * * * *